July 6, 1937.  J. G. EVANS  2,086,515
SPRINKLER
Filed Dec. 12, 1935
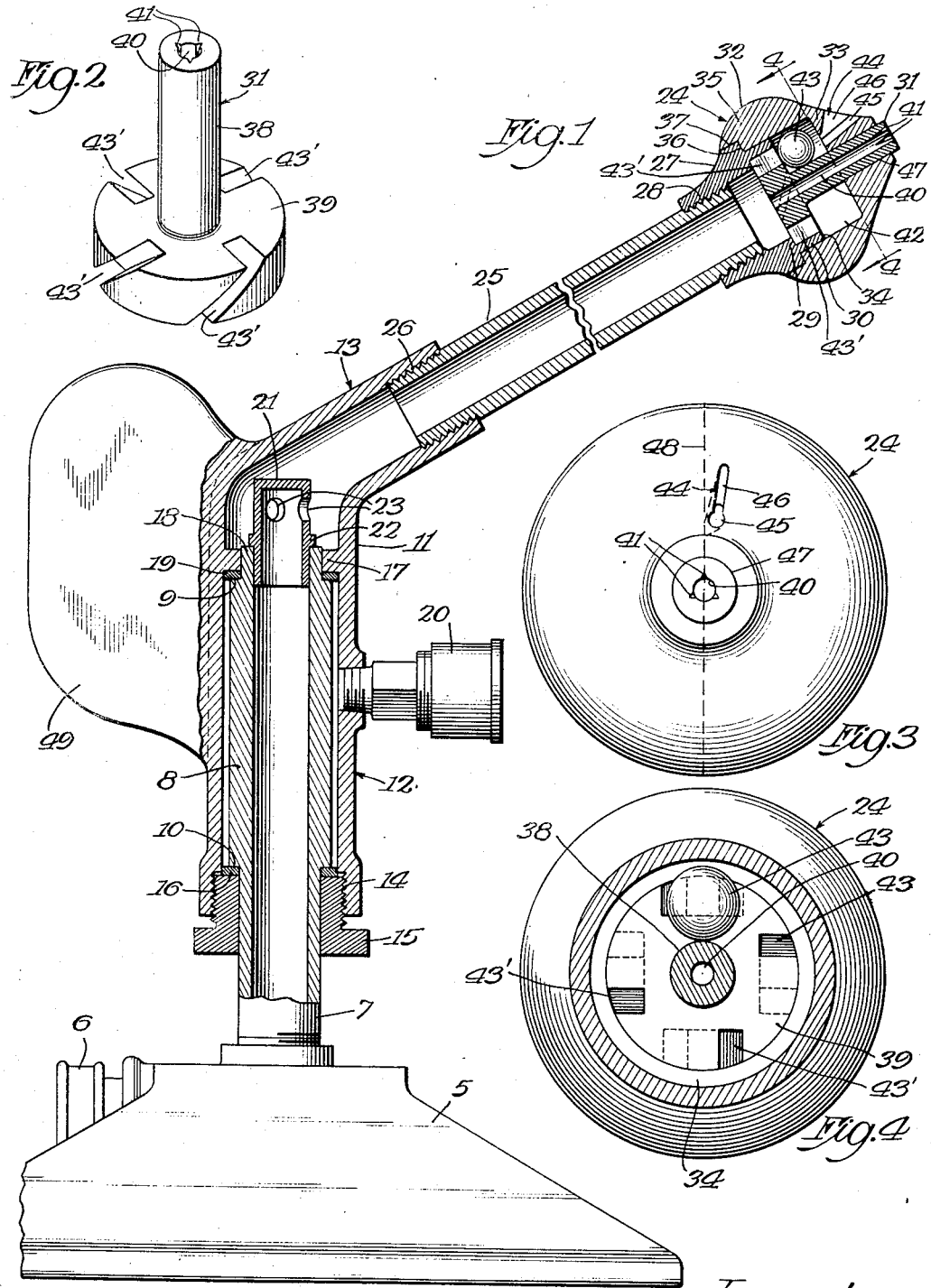
Inventor:
John George Evans
By Fisher, Clapp, Soans & Pond Attys.

Patented July 6, 1937

2,086,515

UNITED STATES PATENT OFFICE 2,086,515

SPRINKLER

John George Evans, Chicago, Ill., assignor to W. D. Allen Manufacturing Company, Chicago, Ill., a corporation of Illinois Application December 12, 1935, Serial No. 54,017

7 Claims. (Cl. 299—69)

This invention relates to improvements in sprinklers and more particularly to sprinklers used for sprinkling comparatively large lawns, golf courses and for other irrigation purposes.

The main objects of the invention are to provide a sprinkler capable of distributing water with reasonable uniformity over a comparatively large area; to provide a sprinkler of the rotary type which will be operative even though its axis of rotation is inclined from the normally vertical as an incident to rough or uneven ground; to provide a rotary sprinkler having enclosed and concealed means for facilitating rotation of the sprinkler; to provide a durable and efficient structure of the type referred to, and in general, it is the object of the invention to provide an improved sprinkler of the type described.

Other objects and advantages of the invention will be understood by reference to the following description and accompanying drawing wherein there is illustrated a rotary sprinkler embodying a selected form of construction.

In the drawing:

Fig. 1 is a side elevation partially showing the rotary element in longitudinal section.

Fig. 2 is a perspective of one element of the structure.

Fig. 3 is an end view of the nozzle and

Fig. 4 is a section on the line 4—4 of Fig. 1.

Referring now to the drawing, the improved sprinkler includes a base 5 of any suitable form. In this instance it is illustrated as being of the sled type which facilitates dragging of the sprinkler by the hose from place to place. The base 5 includes a coupling element indicated at 6 for making connection with a hose, and a standpipe 7 extends upwardly from the base and communicates with the coupling 6.

As shown, the standpipe is of tubular construction and it may be threaded into a suitably tapped opening in the base 5. Near its upper end portion, the standpipe 7 is provided with a circumferentially enlarged portion 8 forming shoulders 9 and 10 at the upper and lower ends of said enlarged portion. The standpipe 7 is normally screwed into the base 5 so that the standpipe will not rotate or readily become disengaged from the base.

A rotor 11 is rotatably mounted on the standpipe and includes a normally vertical portion 12 and an angularly directed upward end portion 13. At its lower end, the vertical portion 12 is enlarged and provided with internal threading 14 for receiving a packing nut 15 which is bored to rotatably fit the standpipe 7. A packing element in the nature of a fibre washer 16 may be interposed between the shoulder 10 and the near end of the packing nut 15 for preventing leakage and for insuring smooth operation of the sprinkler.

Adjacent the upper end of the vertical portion 12 of the rotor, there is formed an internal flange 17 which is properly bored out to rotatably fit the upper end portion 18 of the standpipe which extends beyond the shoulder 9. An anti-friction packing washer of fibrous material 19 may be interposed between the flange 17 and the shoulder 9 on the standpipe, the washer 19 being preferably of the same material as the washer 16.

It will be observed that the rotor may be assembled with the standpipe by placing the packing nut 15 on the lower end portion of the standpipe 7 before the latter is screwed into the base 5. Thereafter the vertical portion 12 of the rotor may be moved downwardly over the standpipe until the flange 17 engages the washer 19 supported by the standpipe shoulder 9. Thereupon the nut 15 may be screwed into the tapped lower end of the rotor. It will be observed that by making the washer 16 of sufficient thickness and the lengths of the threaded cooperating portions of the rotor and nut of proper proportions, the nut 15 may be utilized for adjusting the tightness of the seating of the rotor on the shoulders 9 and 10. However, normally the fit in respect of vertical adjustment is fairly loose so as to avoid a tendency to bind when water is directed into the sprinkler.

Also as indicated, the rotor portion 12 is of somewhat larger internal diameter than the external diameter of the standpipe portion 8. Such enlargement and avoidance of close fit facilitates manufacture and avoids excessive frictional engagement between the standpipe and rotating part. If desired the space between the parts may be packed with grease and a grease-cup indicated at 20 may be provided for supplying grease to said space when needed.

To prevent the water supplied to the rotor from exerting an excessive lifting force on the rotor, a cap element 21 may be fitted to the upper end of the standpipe 7. The cap may be a press fit and its insertion may be limited by providing a stop shoulder such as indicated at 22. A plurality of openings indicated at 23 are provided in the side wall of the cap to permit the escape of water from the standpipe 7 into the angularly directed portion 13 of the rotor.

A nozzle 24 is connected to the angularly directed portion 13 of the rotor by means of a suitable length of pipe 25. The pipe length 25 may be made to suit requirements of any particular case or it may be standardized as best suits the requirements of the manufacturer. Preferably the length of the pipe connection 25 is standardized. As indicated at 26, the pipe connection 25 is threaded into the free end of the rotor portion.

The nozzle 24 is formed in this instance in a mounting member 27 which is threaded as indicated at 28 on the outer end of the connecting pipe 25. Said mounting member is formed so as to provide an internal seat or shoulder 29 and a forwardly extending flange 30. A nozzle tip member 31 (see Fig. 2) is seated on said shoulder 29 within said flange 30 and a cap element 32 fits over and encloses the tip member 31 and the forward end portion of the mounting member 27.

As shown in Fig. 1, the cap member 32 is formed with a front end wall 33 which is spaced considerably forwardly from the inner end 34 of the flange 30. The side wall portion 35 which is enlarged to impart to the nozzle a desired shape is fitted to the outside of the flange 30, the external shoulder 36 and the outer side surface 37 of the mounting member. If desired, the cap member may have a drive fit on the mounting member so as to be more or less permanently united thereto, or it may be threaded on the mounting member so as to be capable of separation therefrom when desired.

The tip member 31 includes an elongated stem 38 which is provided at its inner end with a laterally extending flange 39. The flange 39 is preferably of a thickness substantially equal to the length of the end flange 30 of the mounting member and of a diameter substantially the same as the internal diameter of said end flange 30. The tip member 31 is preferably tightly fitted in said mounting member so as to become rigid therewith and non-rotatable therein although such fitting is not of material importance. However, the tip member is provided with an axial bore 40 extending therethrough and constituting a main discharge outlet for the sprinkler. As shown in Fig. 1, said discharge outlet 40 communicates with the passageway of the pipe or tubular member 25 and with the rotor element 13 so that water delivered to the latter may continue its flow and be discharged through said discharge outlet 40. To cause the stream passing through said outlet 40 to be somewhat broken up into a spray, the outer end of the outlet 40 may be provided with flutes or indentations as indicated at 41.

The cap structure 32 cooperates with the mounting member 27 and the tip member 31 to form an interior chamber 42. A movable member, in this instance a metal ball 43, preferably of non-rusting material, is confined in said chamber 42 but is freely movable therein. The end flange 39 of the tip member 31 is provided with a series of circumferentially spaced, angularly directed slots or openings 43 which establish communication between the passageway of said tubular rotor member and with said chamber 42. An auxiliary outlet 44 comprising a round or drilled portion 45 and a slotted portion 46 serves to permit the escape of water from said chamber 42.

As an incident to the flow of water through said inlet ports or openings 43 into said chamber 42, through said chamber 42 and out through said auxiliary outlet 44, the movable ball element 43 is caused to move or whirl around said chamber with a more or less wavy motion which causes the ball to repeatedly strike portions of the walls of the chamber 42. This action results in a rapid vibrating effect which is imparted to the entire rotor so as to prevent the rotor from freezing or binding in any fixed position on the standpipe 7. Also the vibration thus imparted to the rotor causes a desirable breaking up of the discharged water streams.

As shown, the auxiliary outlet 44 is located in the front or end wall of the nozzle cap 32 in radially offset relation to the axis of the nozzle, said end wall also being bored out as indicated at 47 to snugly fit the outside of the stem portion 38 of the nozzle tip. As indicated in Fig. 3, the nozzle may be so mounted on the rotor that the auxiliary outlet 44 is disposed to one side of a vertical axial plane passing through the rotor nozzle and mounting portion 12 of the rotor, such plane being indicated by the line 48 in Fig. 3. Such offset relation of the auxiliary discharge opening 44 causes the water discharged therefrom to have a re-acting force which effects rotation of the sprinkler rotor when the bearing portion 12 thereof is substantially vertical. The angular position or seating of the auxiliary outlet 44 may be varied considerably depending upon the speed of rotation desired. For sprinkling very large areas it is preferable that the rotation be very slow, in which case the auxiliary outlet is set only slightly to one side of the vertical plane referred to. For fast rotation when sprinkling smaller areas, the auxiliary opening may be adjusted to a position of 90 degrees from said vertical plane. Inasmuch as sprinklers of the type herein contemplated are normally employed for predetermined purposes, it is generally feasible to manufacture the sprinkler with the nozzle set to produce the desired results. Therefore, it is not necessary to provide refined means for permitting angular adjustment of the auxiliary opening 44. However, when the nozzle is mounted on the tubular element 25 through the agency of screw-threading as indicated at 28, the necessary adjustment may be made simply by turning the entire nozzle on the threading 28. Of course said threading should be made a tight fit so that the nozzle will not be loose or become separated and lost from the sprinkler.

To counterbalance the weight of the laterally, upwardly angularly directed portion of the rotary member including the connecting pipe 25 and the nozzle 24, a counterbalancing weight 49 may be formed integral with the vertical portion 12 of the rotor. Such counterbalancing weight should, of course, be proportioned to provide the desired counterbalancing effect to secure free running of the rotary member.

The described construction has been found efficient and operative under widely varied conditions including widely varied water pressures and tilted setting of the sprinkler as a whole. The complete enclosure of the moving, vibration-causing element is an important advantage in that it prevents tinkering with the same and protects the same from damage incident to bumping, dropping or other causes such as are incident to ordinary handling and transporting of sprinklers of this type. Also, the absence of exposed mechanism is an important advantage from an appearance standpoint.

Changes may be made in the described structure without departing from the spirit of the invention, the scope of which should be determined by reference to the following claims, the same being construed as broadly as possible consistent with the state of the art.

I claim:

1. A sprinkler comprising a support, a tubular member mounted to rotate on said support about a vertical axis and having a laterally extending portion terminating in a nozzle, said nozzle having two discharge outlets, one of said outlets extending at an angle to radial lines from the axis of rotation of said tubular member and constituting a reaction jet opening to cause slow rotation of said tubular member when the axis of rotation of the latter is vertical but normally incapable of producing complete rotation in some off vertical positions, and a freely movable member enclosed in said nozzle and associated with one of said outlets so as to be tumbled by water passing therethrough to effect vibration of said tubular member and thereby prevent freezing of the latter in fixed position on said support when the axis of rotation of said tubular member is in such off vertical positions.

2. A sprinkler comprising a support, a tubular member mounted to rotate on said support about a vertical axis and having a laterally extending portion terminating in a nozzle, said nozzle having a main water discharge outlet disposed axially thereof, a chamber communicating with said tubular member, and a reaction jet outlet communicating with said chamber and extending at an angle to radial lines from the axis of rotation of said tubular member to cause slow rotation of said tubular member when its axis of rotation is vertical but normally incapable of producing complete rotation in some off vertical positions, and a ball enclosed and freely movable in said chamber adapted to be tumbled by water passing therethrough to effect vibration of said tubular member and thereby prevent freezing of the latter in fixed position on said support when its axis of rotation is in some off vertical positions.

3. A sprinkler comprising a standpipe, a tubular rotor journaled on said standpipe about a vertical axis, said rotor having a laterally directed portion provided at its outer end with a discharge nozzle, said nozzle comprising an inner member having a forwardly extending stem and a lateral flange at its rear end, said stem and flange having a bore extending therethrough constituting a main water discharge outlet, a cap encircling said inner member and cooperating with said stem and its flange to form an annular chamber around said stem, a movable vibrator member in said chamber serving to reduce friction of said rotor when its axis of rotation is in off vertical positions, said flange having an opening therethrough communicating at one end with said rotor and at its other end with said chamber, and said cap having a reaction jet opening communicating at its inner end with said chamber operative to effect slow rotation of said rotor when its axis of rotation is vertical, but normally incapable of producing complete rotation when said axis is in such off vertical positions.

4. A sprinkler comprising a standpipe, a tubular rotor journaled on said standpipe about a vertical axis, said rotor having a laterally directed portion provided at its outer end with a discharge nozzle, said nozzle comprising an inner member having a forwardly extending stem and a lateral flange at its rear end, said stem and flange having a bore extending therethrough constituting a main water discharge outlet, a cap encircling said inner member and cooperating with said stem and its flange to form an annular chamber around said stem, a movable vibrator member in said chamber serving to reduce friction of said rotor when its axis of rotation is in off vertical positions, said flange having a plurality of circumferentially spaced openings therethrough inclined to the axis of said stem and communicating at one end with said rotor and at its other end with said chamber whereby water flowing therethrough imparts a whirling movement to said vibrator member, and said cap having a reaction jet opening communicating at its inner end with said chamber operative to effect slow rotation of said rotor when its axis of rotation is vertical, but normally incapable of producing complete rotation when said axis is in such off vertical positions.

5. A sprinkler comprising a vertical standpipe, a tubular rotor journaled on said standpipe, said rotor having an upwardly and outwardly inclined portion provided at its outer end with a discharge nozzle, said nozzle comprising a mounting member fitted on said rotor and formed with a seat and a hollow cap fitted onto said mounting member, an inner member comprising an elongated stem extending through the outer end portion of said cap and a flange fitted to said seat, said stem and flange having an axial bore extending therethrough constituting a main water discharge outlet and said cap, stem and flange defining an annular chamber within said nozzle, said flange having an opening therethrough communicating at one end with said rotor and at its other end with said chamber, and a movable vibrator member in said chamber serving to reduce friction of said rotor when its axis of rotation is in off vertical positions; and said cap having a reaction jet opening communicating at its inner end with said chamber operative to effect slow rotation of said rotor when its axis of rotation is vertical, but normally incapable of producing complete rotation when said axis is in such off vertical positions.

6. A sprinkler comprising a vertical standpipe, a tubular rotor journaled on said standpipe, said rotor having an upwardly and outwardly inclined portion provided at its outer end with a discharge nozzle, said nozzle comprising a mounting member fitted on said rotor and formed with a seat and a hollow cap fitted onto said mounting member, an inner member comprising an elongated stem extending through the outer end portion of said cap and a flange fitted to said seat, said stem and flange having an axial bore extending therethrough constituting a main water discharge outlet and said cap, stem and flange defining an annular chamber within said nozzle, the periphery of said flange having a plurality of equally spaced slots inclined to the axis of said stem and communicating at one end with said rotor and at the other end with said chamber, and a freely movable vibrator ball in said chamber serving to reduce friction of said rotor when its axis of rotation is in off vertical positions; and said cap having a reaction jet opening communicating at its inner end with said chamber operative to effect slow rotation of said rotor when its axis of rotation is vertical, but normally incapable of producing complete rotation when said axis is in such off vertical positions.

7. A sprinkler comprising a support, a tubular member mounted to rotate on said support about a vertical axis and having a laterally extending portion terminating in a nozzle, said nozzle having two discharge outlets, one of said outlets being radially directed and the other extending at an angle to radial lines from the axis of rotation of said tubular member and constituting a reaction jet opening to cause rotation of said tubular member, but being normally incapable of producing rotation, and a freely movable member enclosed in said nozzle and associated with said reaction jet opening so as to be tumbled by water passing therethrough to effect vibration of said tubular member, thereby to reduce normal frictional resistance to slow speed rotation of said tubular member so as to prevent freezing of the latter in fixed position on said support, thereby to enable said reaction jet opening to cause said tubular member to rotate slowly.

JOHN GEORGE EVANS.